United States Patent [19]

Cheng et al.

[11] 3,953,973

[45] May 4, 1976

[54] HEAT ENGINE AND HEAT PUMP UTILIZING A WORKING MEDIUM UNDERGOING SOLIDIFICATION AND MELTING OPERATIONS

[76] Inventors: Chen-yen Cheng, 9605 La Playa St., NE., Albuquerque, N. Mex. 87111; Sing-Wang Cheng, Fourth Floor, No. 1, Lane 479, Fu-Hsing North Road, Taipei, China /Taiwan

[22] Filed: May 29, 1974

[21] Appl. No.: 474,317

[52] U.S. Cl. .................................. 60/671; 60/527; 165/2
[51] Int. Cl.² ........................................ F03G 7/06
[58] Field of Search ............ 60/527, 530, 670, 671, 60/651; 165/2

[56] References Cited
UNITED STATES PATENTS

| | | | |
|---|---|---|---|
| 2,215,157 | 9/1940 | Platzner | 60/527 |

FOREIGN PATENTS OR APPLICATIONS

| | | | |
|---|---|---|---|
| 107,381 | 6/1917 | United Kingdom | 60/527 |
| 8,461 | 4/1896 | United Kingdom | 60/527 |
| 1,062,494 | 7/1959 | Germany | 60/527 |

*Primary Examiner*—Allen M. Ostrager

[57] ABSTRACT

The present invention introduces a heat engine, or a heat pump, in which the working medium used is subjected alternatively to solidification and melting operations. A working medium so used is referred to as an S/L type working medium. In a new heat engine, an S/L type working medium is subjected to cyclic operations, each cycle comprises of a high temperature melting step conducted under a first pressure, and a low temperature solidification step conducted under a second pressure. In a new heat pump, each cycle comprises of a high temperature solidification step conducted under a first pressure and a low temperature melting step conducted under a second pressure. When a non-aqueous medium is used, the first pressure and the second pressure are a relatively high pressure and a relatively low pressure, respectively. When an aqueous medium is used the two pressures are a relatively low pressure and a relatively high pressure, respectively. it is noted that the operation of a heat pump is the reverse operation of a heat engine.

5 Claims, 22 Drawing Figures

An Engine Utilizing an S/L Type Working Medium

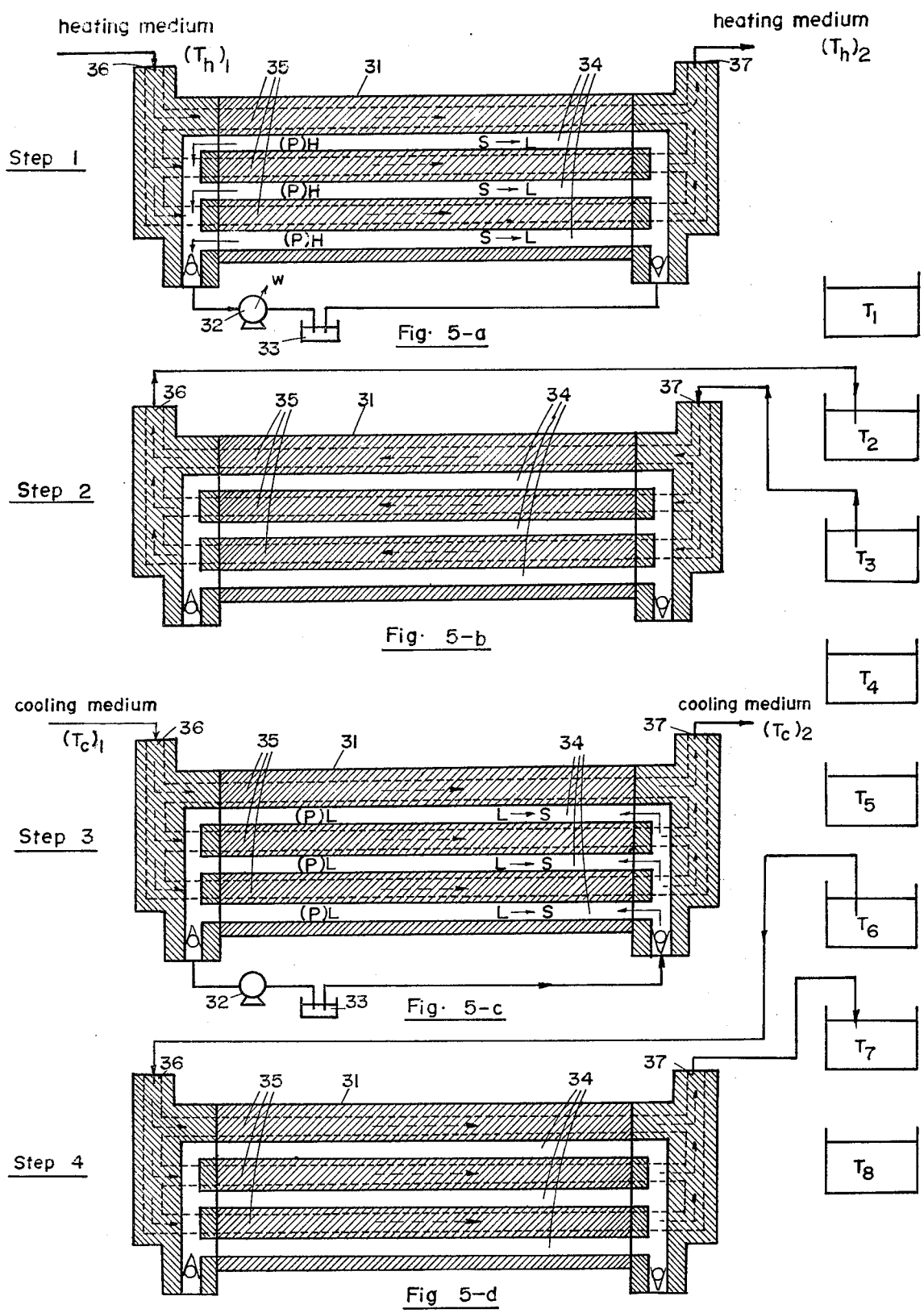

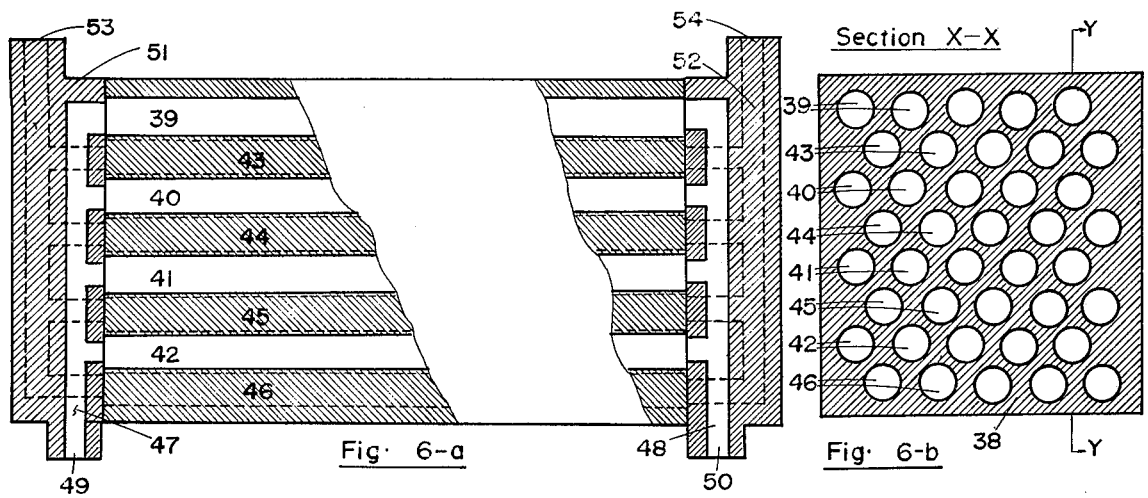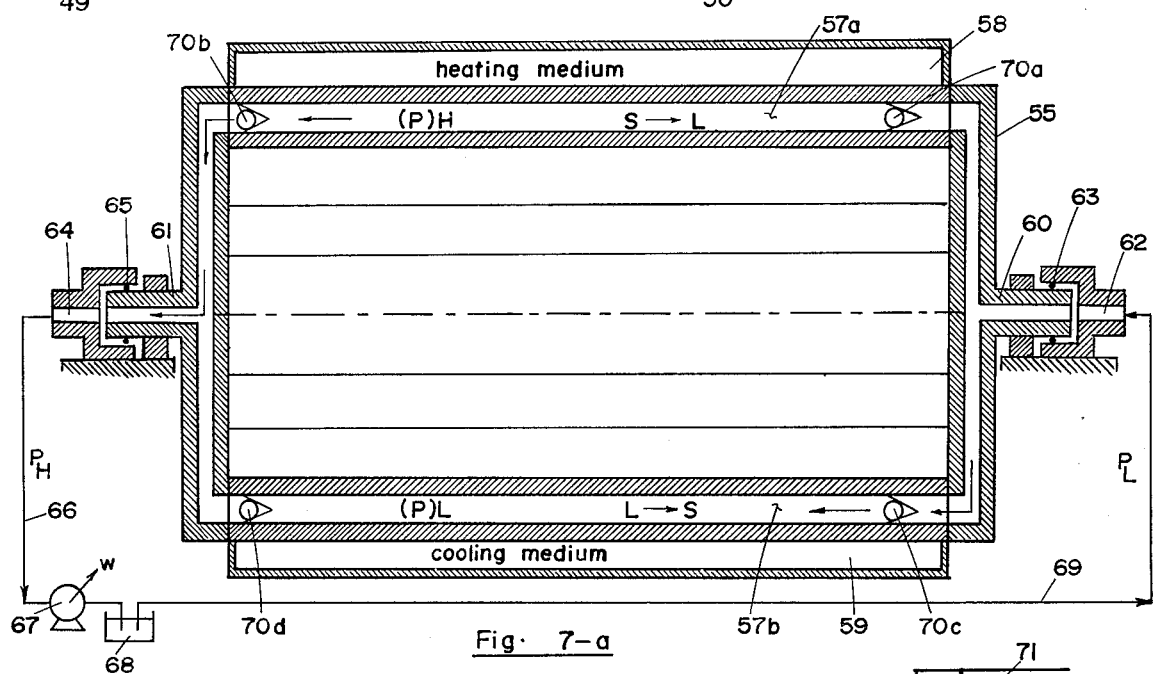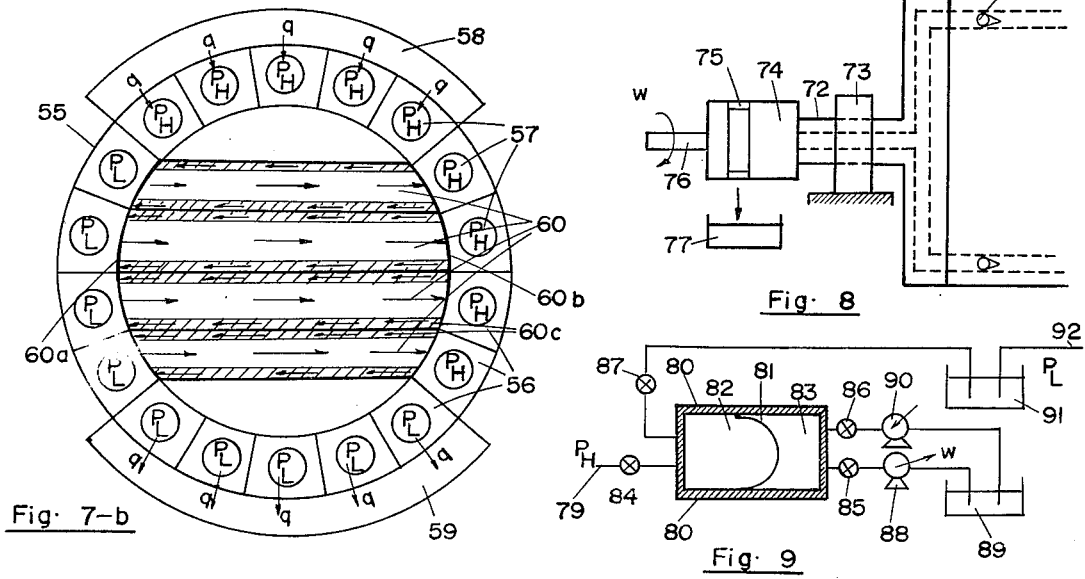

A Heat Pump Utilizing an S/L Type Working Medium

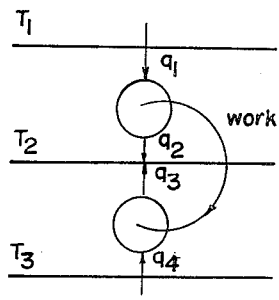
Fig. 14-a
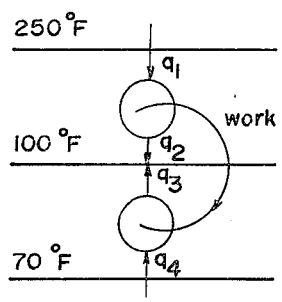
Fig. 14-b
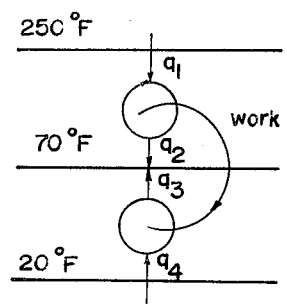
Fig. 14-c
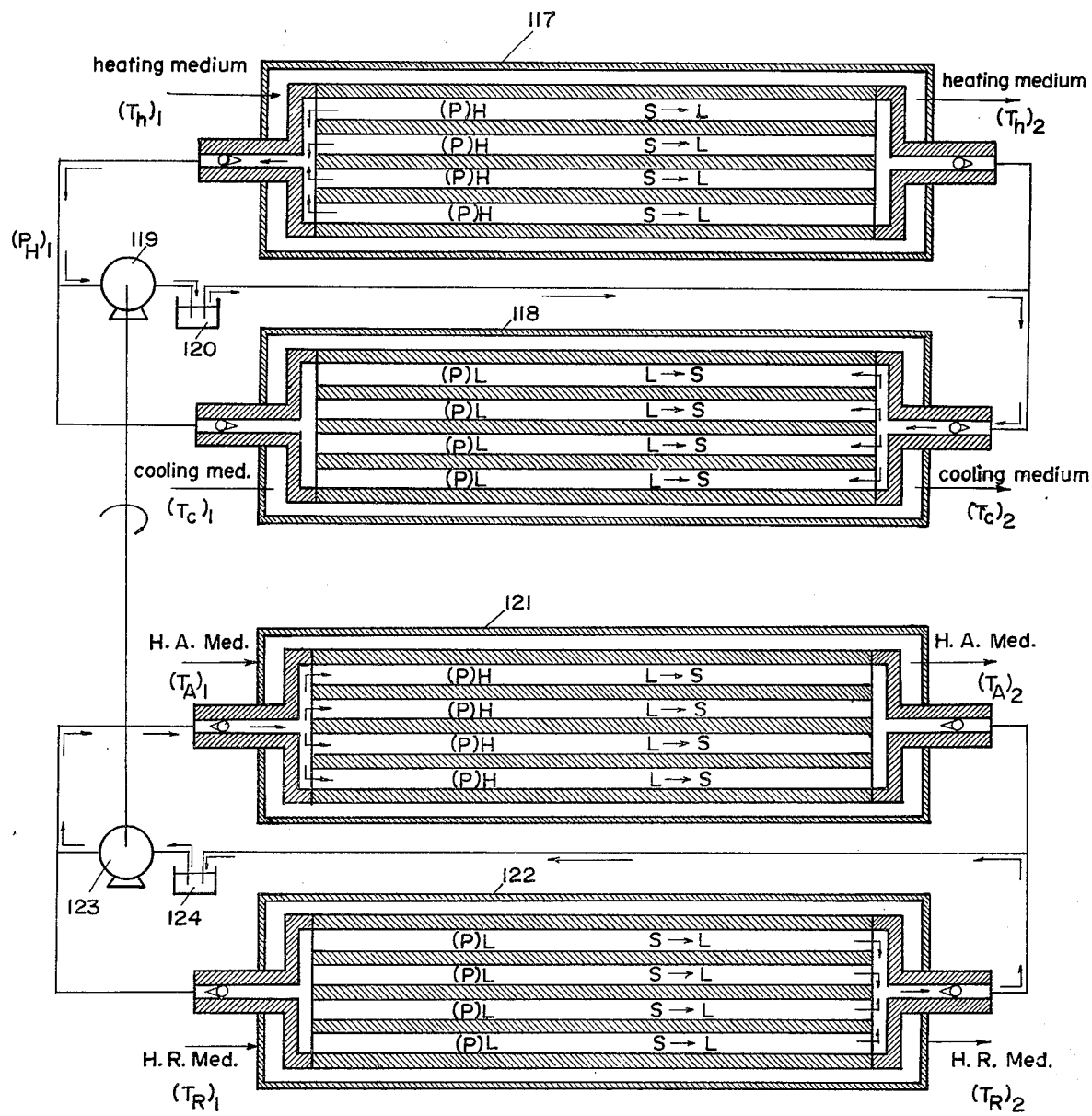
Fig. 15

HEAT ENGINE AND HEAT PUMP UTILIZING A WORKING MEDIUM UNDERGOING SOLIDIFICATION AND MELTING OPERATIONS

BACKGROUND OF THE INVENTION

1. Field of the Invention

The invention relates to a method and apparatus for converting heat energy into work energy and also for pumping heat energy from a low temperature level to a high temperature level. A characteristic feature of the invention is in the use of a working medium which is subjected to a cyclic operation, each comprises of a melting step and a solidification step operated under two pressure levels and at two temperature levels.

2. Brief Description of the Prior Art

In a conventional external heat engine, a working medium, such as water, is generally subjected to a high pressure vaporization operation to absorb heat at a high temperature level, the resulting high pressure vapor is depressurized through a turbine to produce work, the exhaust vapor from the turbine is condensed at a low pressure to reject heat at a low temperature level, and finally the condensate is returned to the high pressure vaporization operation described.

In a conventional heat pump, a refrigerator on an air conditioner, a working medium, such as ammonia and Freon, is vaporized at a low temperature level, the low pressure medium vapor is then compressed to a high pressure, the resulting pressurized medium vapor is condensed under the high pressure to release heat at a high temperature level and finally the condensed medium is returned to the low pressure vaporization operation. The efficiencies of these conventional heat engines and heat pumps are generally less than 70% of the theoretical thermodynamic efficiencies.

BRIEF DESCRIPTION OF THE PRESENT INVENTION

The present invention introduces a heat engine, or a heat pump, in which the working medium used is subjected alternatively to solidification and melting operations. A working medium so used is referred to as an S/L type working medium. In a new heat engine with a non-aqueous S/L type medium, the medium is melted under a high temperature $T_H$ and a high pressure $P_H$ to absorb heat and is solidified under a low temperature $T_L$ and a low pressure $P_L$ to release heat. Since the non-aqueous medium expands as it is melted under the high pressure and contracts as it is solidified under the low pressure, the system does work to its surrounding. Since water expands on solidification and contracts on melting in a new heat engine with an aqueous medium, the medium is melted under a high temperature and a low pressure to absorb heat and is solidified under a low temperature and a high pressure to release heat. Since the aqueous medium expands under the high pressure as it is solidified and contracts under the low pressure as it is melted, the system does work to the surrounding. The operation of a heat pump is just the reverse operation of a heat engine. A new engine comprises of multiplicity of longitudinal conduits which are connected through a first check valve to a high pressure zone and through a second check valve to a low pressure zone. Referring to a heat engine utilizing a non-aqueous S/L medium, medium liquid in an amount equivalent to volume expansion associated with the high pressure melting operation is discharged to the high pressure zone through the first check valve from each conduit during a melting step and an equivalent amount of medium enters each conduit during a solidification step through the second check valve. The medium discharged under the high pressure may be depressurized through a hydraulic motor to do work and becomes low pressure medium. For a heat engine utilizing an aqueous S/L medium, medium liquid in an amount equivalent to volume expansion associated with high pressure solidification is discharged to the high pressure zone through the first check valve from each conduit during a solidification step and an equivalent amount of medium enters each conduit during a melting step through the second check valve. A new heat pump is about the same as a new heat engine. The operation of a heat pump is the reverse operation of that of a heat engine and work has to be supplied to the system.

BRIEF DESCRIPTION OF THE DRAWINGS

FIGS. 5-a through 5-d illustrate the processing steps.

FIGS. 6-a and 6-b illustrate a new heat engine or a heat pump comprising of a multivoid metal block which contains two sets of conduits, denoted as A-set conduits and B-set conduits. An S/L type working medium is contained in the A-set conduits and is subjected alternatively to a melting operation and a solidification operation as a heating medium and a cooling medium is alternatively passed through the B-set conduits.

FIG. 7-a and 7-b illustrate another heat engine, or a heat pump, comprising of a rotor which contains a multitude of conduits along its periphery. An S/L type working medium is contained in these conduits. As the rotor rotate, a conduit goes through a preheating zone, a melting zone, a cooling zone and a solidification zone. Referring to FIG. 7-a, the rotor is connected to a high pressure zone and a low pressure zone. Medium fluid discharged to the high pressure end is depressurized through a hydraulic motor to do work. Low pressure medium liquid then enters the unit at the low pressure end.

FIG. 8 illustrates a direct connection between a hydraulic motor to the high pressure end of the heat engine to eliminate a high pressure rotary seal.

FIG. 9 illustrates a barrier vessel to separate the working medium from hydraulic fluid.

FIGS. 14-a through 14-c illustrate that the work that can be obtained from a heat engine operated between $T_1$ and $T_2$ can be used in supplying the work needed in a heat pump pumping heat from $T_3$ to $T_2$.

FIG. 15 illustrates a work coupling between a heat engine and a heat pump, both utilizing S/L type working mediums.

DESCRIPTION OF PREFERRED EMBODIMENTS OF THE INVENTION

The present invention introduces a heat engine, or a heat pump, in which the working medium used is subjected alternatively to solidification and melting operations. A working medium so used is referred to as an S/L type working medium. For a normal substance, the solid is denser than the liquid. Therefore, a normal substance expands as it is melted and contracts as it is solidified. It is for few cases, water, bismuth and gallium, that the liquid is denser than the solid. Such an abnormal substance expands as it is solidified and contracts as it is melted. In the present disclosure, S/L type working mediums are classified into non-aqueous mediums and aqueous mediums which are respectively used to mean the normal substances and abnormal substances. Throughout most part of the present disclosure, the use of a non-aqueous medium is assumed. The modifications needed in the equipment and operational procedures when an aqueous medium is used are discussed. Since the operation of a new heat pump is just the reverse operation of a new heat engine, its operation will be obvious to one skilled in the art. Therefore, the major part of the present disclosure will be devoted to the principle of operation, construction and operational procedures of new heat engines.

The main objective of the present invention is in developing an efficient heat engine which can make use of low grade heat energy, i.e. heat energy that is available at a low temperature level such as waste heat and solar energy. Another objective is to develope a heat pump having a high thermodynamic efficiency. Still another objective is to develope a heat engine-heat pump combination with work coupling between a heat engine and a heat pump. Such a combined heat engine-heat pump may be useful for house heating and house cooling.

The melting point of a substance varies with applied pressure according to the Clapeyron-Clausius equation. Melting point of a abnormal substance, such as water, bismuth and gallium, is lowered as the applied pressure is increased. Melting point of normal substance increases as the applied pressure is increased. Table 1 shows dP/dT values for the melting curves of various substances (1).

Figure 1:
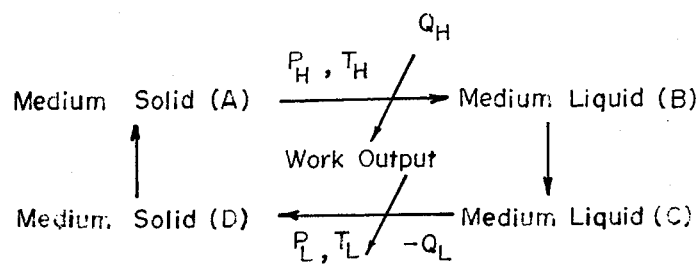
FIG. 1 illustrates the principle of operation of a new heat engine utilizing a non-aqueous S/L type medium. It shows that the medium is subjected to a cyclic operation: it is melted under a high temperature $T_H$ and a high pressure $P_H$ and the medium is then solidified under a low temperature $T_L$ and a low pressure $P_L$.
Figure 2:
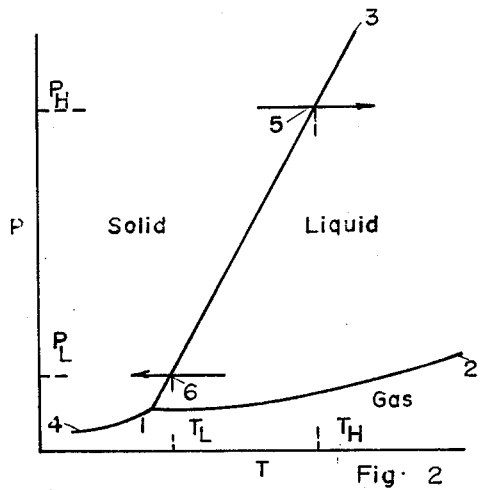
FIG. 2 and FIG. 3 respectively illustrate the principle of a new heat engine utilizing a non-aqueous S/L type medium on a P–T diagram and a P-V diagram.
Figure 3:
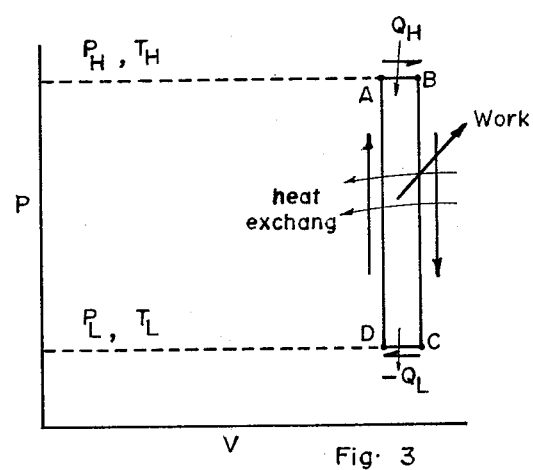

FIG. 1 illustrates the principle of operation of a new heat engine utilizing a non-aqueous and normal S/L type medium. FIG. 2 schematically illustrates the phase diagram (P-T diagram) of the normal working medium, density of solid being higher than that of liquid. It shows the triple point 1, the vaporization line 1-2, the melting line 1-3, and the sublimation line 4-1. Referring to points 5 and 6, the medium is to be subjected to a cyclic operation comprising of a high pressure $P_H$ high temperature $T_H$ melting step and a low pressure $P_L$ low temperature $T_L$ solidification step. FIG. 3 shows a P-V diagram of the medium and shows the volume changes at points 5 and 6 and along line 5-6 of FIG. 2.

Referring to FIGS. 1, 2, and 3, the medium in the heat engine undergoes a cyclic operation which comprises of four steps; viz. A-B, B-C, C-D and D-A. During the first step, the medium solid (A) is melted to become medium liquid (B) under a high pressure $P_H$ and a high temperature $T_H$ by absorbing heat $Q_H$. The valume expands during this step. During the second step, the medium liquid (B) is depressurized and cooled to $P_L$ and $T_L$ and becomes medium liquid (C). During the third step, the medium liquid (C) is solidified by releasing heat ($-Q_L$) under a low pressure $P_L$ and a low temperature $T_L$ and becomes medium solid (D). The medium contracts during this step. The medium solid (D) is then pressurized from $P_L$ to $P_H$ and heated from $T_L$ to $T_H$ and becomes medium solid (A). The next cycle is then initiated. The engine does work by expanding under the high pressure $P_H$ and contracting under the low pressure $P_L$.

Table 1

$\left(\dfrac{\Delta P}{\Delta T}\right)$ Values for the Melting Curves of Various Substances

| Substance | Normal Melting Point (°C) | P/T (atm./°C) |
|---|---|---|
| Water | 0 | −100 |
| Methane | −182.49 | + 39 |
| Ethylene | −169.5 | + 70 |
| Benzene | 5.50 | + 37 |
| P-xylene | 13.2 | + 29 |
| Bibenzyl | 51.8 | + 34 |
| Cyclohexane | 6.55 | + 19 |
| Carbon Tetrachloride | −22.95 | + 28 |
| Ethylene Dibromide | 9.95 | + 40 |
| o-Dichlorobenzene | 53.15 | + 28 |
| p-dibromobenzene | 87.3 | + 27.5 |
| Cetyl Alcohol | 49.10 | + 43 |
| Acetic Acid | 16.55 | + 48.5 |
| Bromobenzene | −5.50 | + 53 |
| n-Caproic Acid | −3.9 | + 55 |

At least a part of the heat released in cooling the medium liquid from $T_H$ to $T_L$, from state B to state C, may be utilized in heating the medium solid from $T_L$ to $T_H$, from state D to state A.

When an abnormal substance such as an aqueous solution is used as working medium, the process description given above has to be modified. For such a medium, the volume expands as it is solidified and the volume contracts as it is melted and the melting line in FIG. 2 has a negative slope. The medium therefore melts at a lower temperature under a higher applied pressure. In such case, the medium in the heat engine undergoes a cyclic operation which comprises of four steps: viz. A-B, B-C, C-D and D-A. During the first step, the medium solid (A) is melted under a low pressure $P_L$ and under a high temperature $T_H$ to become medium liquid (B) by absorbing heat $Q_H$. The volume of the medium contracts during this step. During the second step, the medium liquid (B) is pressurized to $P_H$ and cooled to $T_L$ and becomes medium liquid (C). During the third step, the medium liquid (C) is solidified by releasing heat ($-Q_L$) under a high pressure $P_H$ and a low temperature $T_L$ and becomes medium solid (D). The medium expands during this step. The medium solid (D) is then depressurized from $P_H$ to $P_L$ and heated from $T_L$ to $T_H$ and becomes medium solid (A). The next cycle is then initiated. This engine also does work by expanding under the high pressure $P_H$ and contracting under the low pressure $P_L$. Again, at least a part of the heat released in cooling the medium liquid from state B to state C may be utilized in heating the medium solid from state D to state A.

Figure 4:
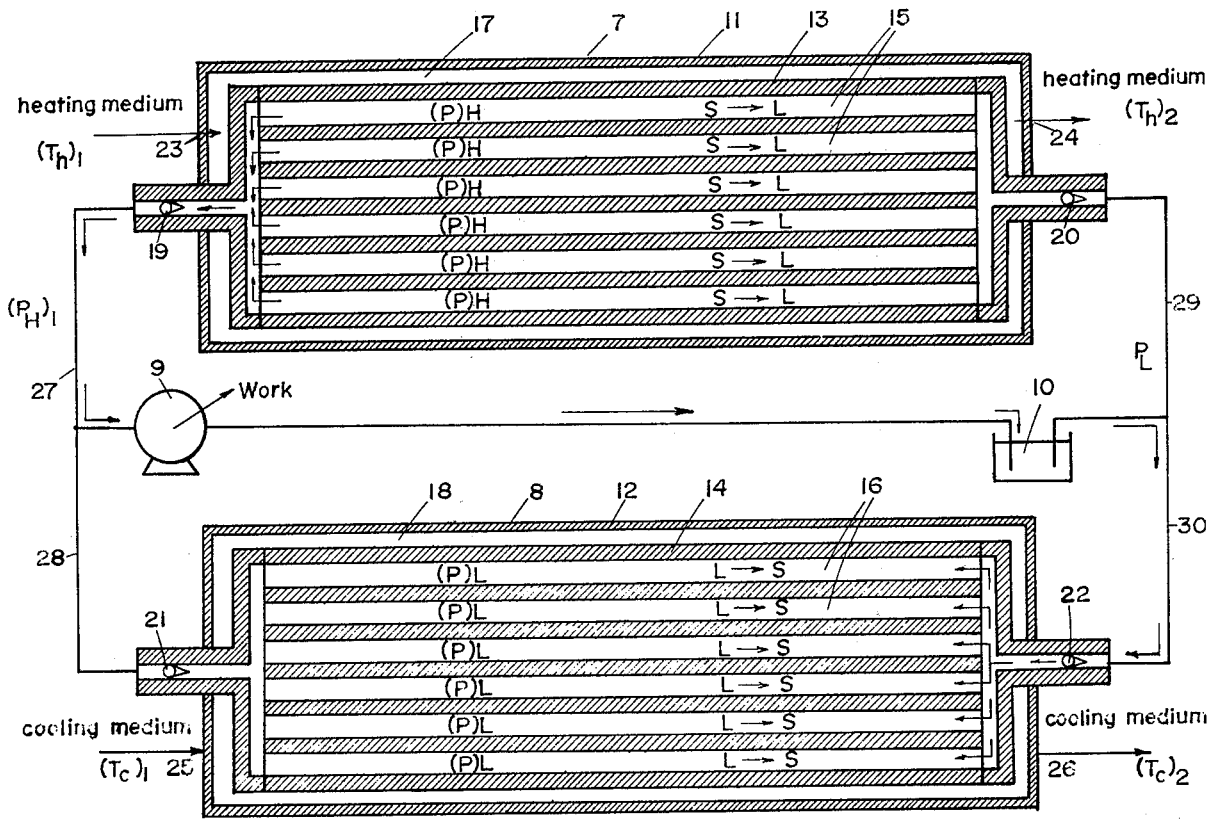
FIG. 4 illustrates the construction and operation of a new heat engine. Referring to the figure, a new heat engine comprises of a multiplicity of longitudinal conduits which can sustain a high pressure and are in fluid communication with a high pressure zone through a first check valve are are in fluid communication with a low pressure zone through a second check valve. Medium fluid discharged to the high pressure zone is depressurized through a hydraulic motor to do work.

Detailed operational procedures are presented by referring to FIG. 4 and FIGS. 5-a through 5-d. Two types of heat engines are illustrated by FIGS. 6-a and 6-b and FIGS. 7-a and 7-b respectively. The description is made by referring to a heat engine utilizing a normal working medium. The operation of a heat engine utilizing an abnormal medium, such as an aqueous solution, will be obvious to a person skilled in the art and will be omitted.

FIG. 4 shows two heat engine units 7 and 8, a hydraulic motor or a turbine 9 and a medium storage tank 10. The two heat engine units 7 and 8 respectively comprise of outer vessels 11 and 12, multivoid metal blocks 13 and 14 containing multitude of conduits 15 and 16 which contain an S/L type working medium and are connected to a high pressure lines 27 and 28 through check valves 19 and 21 respectively and are connected to a low pressure lines 29 and 30 through check valves 20 and 22 respectively. The medium in each heat engine unit undergoes the four steps described earlier. As shown in the figure, a heating medium is passed through the first unit from 23 to 24, to cause a high temperature and high pressure melting of the medium. A volume of medium in equivalent to the volume expansion associated with the melting operation is discharged through the check valve 19 and the high pressure line 27 and depressurized through the hydraulic motor 9 to do work. The depressurized mediium liquid is stored in the medium tank 10. A cooling medium is shown to be passed through the second unit from 25 to 26 to cause a low temperature low pressure solidification of the medium. A volume of medium in equivalent to the volume constraction associated with the solidification operation enters from the medium tank through the low pressure line 30 and through the check valve 22 and into the conduits of the unit. The functions of the two units alternate. The second step (B–C) and the fourth step (D–A) are not illustrated in FIG. 4 but are illustrated in FIGS. 5-b and 5-d.

FIGS. 5-a, 5-b, 5-c and 5-d respectively illustrate steps A-B, B–C, C–D and D–A described earlier that are conduced in a multivoid heat engine. The figures illustrate a multivoid heat engine unit 31, a hydraulic motor 32, a medium storage tank 33 and tanks containing intermediate heat exchange mediums at intermediate temperatures $T_1$, $T_2$, $T_8$ between $T_H$ and $T_L$. The heat engine unit 31 contains two sets of conduits 34 and 35. The first set of conduits contains a normal S/L type working medium. The second set of conduits are to be used for passing a heating medium, a cooling medium and intermediate heat exchange mediums. During the first step, step A-B, a high temperature $(T_h)_1$ heating medium enters the conduits 35 from entrance 36 and exits at the exit 37 at $(T_h)_2$. The medium in the conduits 34 is melted under a high pressure $P_H$ and a high temperature $T_H$. A quantity of medium liquid is discharged at the high pressure and depressurized through the hydraulic motor 32 and stored in the medium tank 33. Tanks $T_1$ through $T_8$ store intermediate heat exchange mediums at temperatures $T_1$ through $T_8$ which are intermediate temperatures between $T_H$ and $T_L$. During the second step, step B–C, intermediate heat exchange medium at $T_2$ is passed through the unit and be heated to $T_1$ and stored in tank $T_1$, then intermediate heat exchange medium at $T_3$ is passed through the unit and be heated to $T_2$ and stored in tank $T_2$ etc., till finally, heat exchange medium at $T_8$ is passed through the unit and is heated to $T_7$ and stored in tank $T_7$. By this time, the medium in the unit is cooled down to $T_L$ and the second step is completed. During the third step, step C–D, a cooling medium enters at $(T_c)_1$ and at 36 and leaves at $(T_c)_2$ and at 37 to solidify the medium at a low temperature $T_L$ and under a low pressure $P_L$. A quantity of low pressure medium enter the conduits 34 to compensate for the volume shrinkage associated with the solidification of the medium. During step 4, step D–A, intermediate heat exchange mediums at $T_1$, $T_2$, - - - - $T_7$ are successively passed through the unit to heat the medium in the unit from $T_L$ to $T_H$ and respectively become mediums at $T_2$, $T_3$, - - - - $T_8$ and are respectively stored in tanks $T_2$ through $T_8$. The operations described are repeated.

FIGS. 6-a and 6-b respectively illustrate a longitudinal cross-section and a transverse cross-section of a stationary type new heat engine. It comprises of a multivoid metal block and headers with manifold means 47, 48, 51 and 52 at each end. The multivoid metal block contains a first set of conduits 39, 40, 41 and 42 and a second set of conduits 43, 44, 45 and 46. The first set of conduits is used to contain an S/L type working medium and a heating medium, intermediate heat exchange mediums and a cooling medium are to pass through the second set of conduits to cause the working medium to undergo the four steps, viz. A–B, B–C, C–D and D–A, described. One exit 49 of the first set of conduits is to be connected through a check value to a high pressure line and to a hydraulic motor, and the other exit 50 of the first set of conduit is to be connected through a check valve to a low pressure line and to a medium storage tank. Inlet and outlet 53 and 54 to the second set of conduits are also provided at the two headers.

FIGS. 7-a and 7-b respectively illustrate a longitudinal crosssection and a transverse cross-section of a rotary type new heat engine. It comprises of a rotor 55 with two rotary headers and trunions 60 and 61, a stationary inlet 62 with a rotary seal 63, a stationary outlet 64 with a rotary seal 65, a conduit for the passage of a heating medium 58 a conduit for the passage of a cooling medium 59, heat exchange compartments 60, a hydraulic motor 67 and a medium storage 68. The rotor 55 may be divided into multitude of segments 56; each segment contains a longitudinal conduit which contains an S/L type working medium and each conduit is provided with two check valves, 70 a and 70 b, one at each end.

Referring to FIG. 7-b, the rotor is to be rotated counter clockwise. As the rotor is rotated, the medium in each conduit successively goes through a high pressure melting zone 58, an intermediate cooling zone, a low pressure solidification zone 59, and an intermediate heating zone. The changes of the medium in these steps correspond to steps A–B, B–C, C–D and D–A respectively. Each segment of the intermediate heat exchange zone may be made to function as a heat siphon tube to cause heat exchange between the medium in the left hand conduits to the medium in the right hand conduits. Each heat exchange segment contains a heat exchange medium, which vaporizes at the left end and condense at the right end to assist heat exchange between the conduits in the left to the conduits in the right. While a conduit is in the heating zone, the medium therein is melted under a high pressure, and an amount of the medium equivalent to volume expansion due to the melting is discharged from the conduit through the left hand check valve 70b and discharge into the high pressure line 66 and through the hydraulic motor and depressurized. While a conduit is in the cooling zone, the medium therein is solidified under a low pressure, and an amount of medium enters the conduit through the right hand check valve 70c to compensate for the volume shrinkage. The engine does work at the hydraulic motor 67.

Some operational difficulty may be experienced at the high pressure rotary seal 65. Referring to FIG. 8, such a high pressure rotary seal may be avoided by installing a hydraulic motor 74 directly to the trunion 72 of the rotor. Useful work is obtained at shaft 76 and depressurized medium is collected into a medium tank 77.

Medium liquid may not have sufficient lubricating property to be admitted to a hydraulic motor. In that case the high pressure medium liquid obtained in a high pressure melting operation may be used to pressurize and displace a hydraulic oil, which in turn may be used to actuate a hydraulic motor. Referring to FIG. 9, with valves 86 and 87 in closed positions, high pressure medium liquid enters a barrier tank 80 provided with a bladder 81 through inlet 79 and valve 84 to displace hydraulic oil through 83 and valve 85 and through a hydraulic motor 88. This operation is stopped before the bladder reaches the right end. Valves 84 and 85 are then closed and hydraulic oil is pumped into the right hand compartment 83 of the barrier tank through a low head pump 90 and valve 86 to displace the medium liquid out of the barrier tank and through valve 87 into a medium storage tank 91. Medium may be taken from the tank to supply medium into a conduit in which medium is being solidified.

Figure 10:
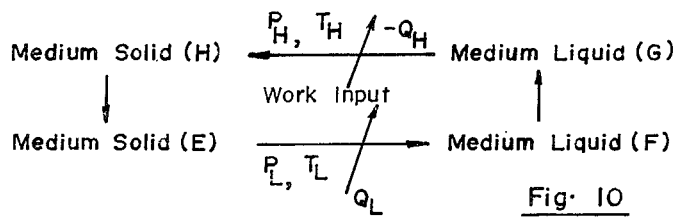
FIG. 10 illustrates the principle of operation of a new heat pump utilizing a non-aqueous S/L type medium. It shows that the medium is subjected to a cyclic operation: the medium is melted under a low temperature $T_L$ and a low pressure $P_L$ and the medium is then solidified under a high temperature $T_H$ and a high pressure $P_H$. Heat is thus absorbed at $T_L$ and released at $T_H$ and work is supplied to accomplish this heat pumping.
Figure 11:
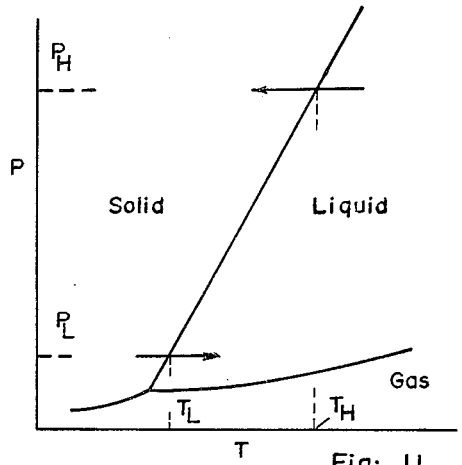
FIGS. 11 and 12 respectively illustrate the principle of a new heat pump utilizing a non-aqueous S/L type medium on a P-T diagram and a P-V diagram.
Figure 12:
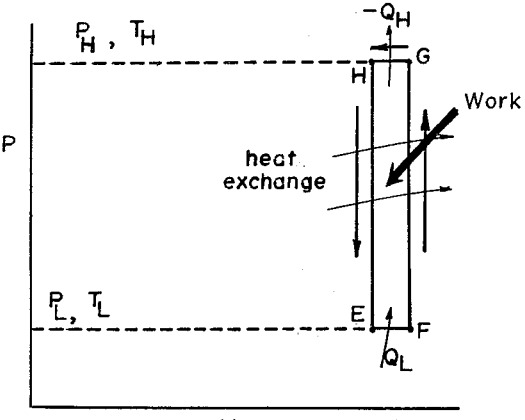

FIG. 10 illustrates the principle of operation of a new heat pump utilizing a normal S/L type working medium, the melting point of which increases as the applied pressure increases. FIGS. 11 and 12 further illustrate the principle of the new heat pump by referring to a P-T diagram and P-V diagram of the medium respectively. In operating the heat pump, the medium is subjected to a cyclic operation comprising of four steps; viz E-F, F-G, G-H, and H-E. During the first step, E-F, the medium solid (E) is melted to become medium liquid (F) under a low pressure $P_L$ and a low temperature $T_L$ to absorb heat $Q_L$. The medium expands during this period. During the second step, F-G, the medium liquid (F) is pressurized and heated to become medium liquid (G). During the third step, the medium liquid (G) is solidified by releasing ($-Q_H$) under a high pressure $P_H$ and at a high temperature $T_H$ and becomes medium solid (H). The medium contracts and work has to be applied to the medium at the high pressure during this step. During the fourth step, the medium solid (H) is depressurized from $P_H$ to $P_L$ and cooled from $T_H$ to $T_L$ and becomes medium solid (E). The next cycle is then initiated. Work has to be supplied to the medium to carry out the above described cyclic operations. It is noted that the operational procedures of a heat pump is the reverse operations of that of a heat engine.

When an abnormal S/L medium, such as an aqueous medium, is used as a working medium, the process description given above has to be modified, because the medium expands as it is solidified and contracts as it is melted. For such a medium, the melting line in FIG. 11 has a negative slope and the medium melts at a lower temperature under a higher applied pressure. When such an abnormal medium is used, the four steps, E-F, F-G, G-H and H-E should be modified as follows:

1. During the first step, E-F, the medium solid (E) is melted to become medium liquid (F) under a high pressure $P_H$ and a low temperature $T_L$ by absorbing heat $Q_L$. The medium contracts and work has to be done to the medium during this step.

2. During the second step, F-G, the medium liquid (F) is depressurized and heated to become medium liquid (G).

3. During the third step, G-H, the medium liquid (G) is solidified to become medium solid (H) under a low pressure $P_L$ and at a high temperature $T_H$ by releasing heat $-Q_H$.

4. During the fourth step, H-E, the medium solid (G) is pressurized and cooled to become medium solid (E).

Figure 13:
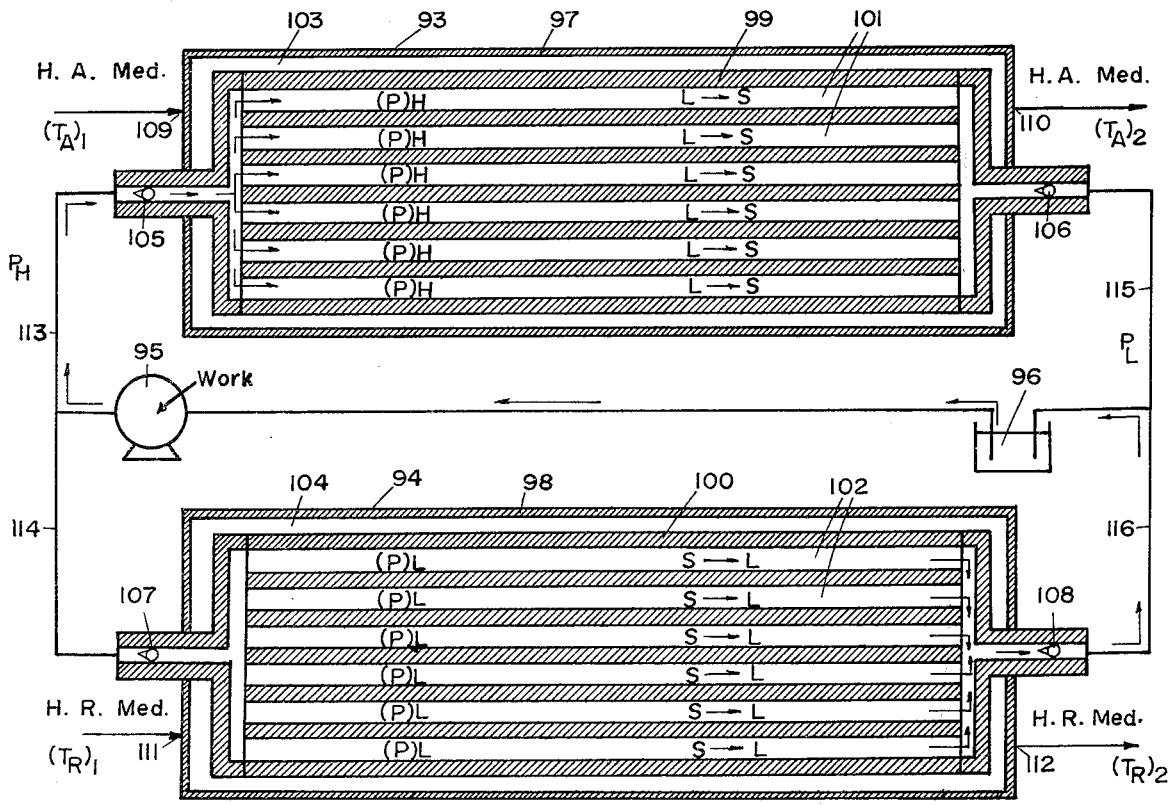
FIG. 13 illustrates the construction and operation of a new heat pump. The operation of a new heat pump is just the reverse operation of that of a new heat engine.

Detailed operational procedures of a new heat pump are presented by referring to FIG. 13. The description is made by referring to a heat pump utilizing a normal working medium. The operation of a heat pump which uses an abnormal medium will be obvious to a person skilled in the art and will not be described. FIG. 13 shows two heat pump units 93 and 94, a hydraulic pump 95 and a medium storage tank 96. The two heat pump units 93 and 94 respectively conprise of outer vessels 97 and 98, multivoid metal blocks 99 and 100, containing multitude of conduits 101 and 102 which contain a normal S/L medium and are connected to high pressure lines 113 and 114 through check valves 105 and 107 respectively and are connected to low pressure lines 115 and 116 through check valves 106 and 108 respectively. The medium in each heat pump unit undergoes the four steps described above. As shown in the figure, the medium in the first unit is undergoing the high pressure solidification step and the medium in the second unit is undergoing the low pressure melting step. A quantity of medium is shown to be pressurized through the hydraulic pump and enters the first unit to compensate for the volume shrinkage associated with the solidification operation. A quantity of the medium in the second unit is shown to be discharged from the second unit as the medium is melted. Heat exchange operation between the second step, F-G and the third step, H-E, is not illustrated, but is similar to what has been described in connection with the operation of a heat engine.

FIG. 14-a illustrates a work coupling between a heat engine and a heat pump. It shows that a heat engine which absorbs heat $q_1$ at a temperature $T_1$ and releases heat ($-q_2$) at a second temperature $T_2$, $T_1$ being higher than $T_2$, may supply the work needed in a heat pump which absorbs heat $q_4$ at a third temperature $T_3$ and releases heat ($-q_3$) at the said second temperature $T_2$, $T_3$ being lower than $T_2$. Solar heating and cooling have arose great interest recently. FIGS. 14-b and 14-c respectively illustrate how the work-coupling between a heat engine and a heat pump may be adopted in house cooling and house heating respectively. Let us assume that heat energy has been made available at 250°F by solar energy collector or by some other means and we are interested in cooling and heating a house efficiently. For house cooling, let use assume that the ambient temperature in 100°F and a house is to be maintained at 70°F. One can use a heat engine which absorbs heat $q_1$ from the heat source at 250°F and rejects heat $-q_2$ at the ambient temperature 100°F and use the work so obtained to run a heat pump which pumps heat $q_4$ out from the house maintained at 70°F and rejects heat $-q_3$ to the ambient temperature 100°F. The heat removed from the house is $q_4$. For house heating, let us assume that the ambient temperature is 20°F and a house is to be maintained at 70°F. One can use a heat engine which absorbs heat $q_1$ from the heat source at 250°F and rejects heat $-q_2$ to the house temperature maintained at 70°F to provide the work needed in running a heat pump which pumps heat $q_4$ from the ambient temperature 20°F and rejects heat $-q_3$ at the house temperature. Therefore, the heat received by the room is $q_2 + q_3$. Should a conventional direct heating be used, the amount of heat utilized in the house heating would be $q_1$. The amount of heat made available for house heating in this way, $q_2 + q_3$, is several times of that of a direct heating, $q_1$. For an ideal operation, the relations between $q_1$, $q_2$, $q_3$ and $q_4$ can be evaluated from Carnot's Engine equations. Therefore, $$\frac{-q_2}{q_1} = \frac{T_2}{T_1} \quad \text{and} \quad \frac{-q_3}{q_4} = \frac{T_2}{T_3}$$

wherein $T_1$, $T_2$, and $T_3$ are in absolute temperatures. Of course, there is some degree of non-ideality involved in any heat engine and heat pump. However, it is noted that the efficiencies of a new engine and a new heat pump described are better than those of a conventional heat engine and a conventional heat pump.

FIG. 15 illustrates the work coupling between a heat engine and a heat pump. The figure shows two heat engine units 117 and 118 with a hydraulic motor 119 abd two heat pumps units with a hydraulic pump 123. The heat engine units are heated by a heating medium which operates between $(T_h)_1$ and $(T_h)_2$ and cooled by a cooling medium which operated between $(T_c)_1$ and $(T_c)_2$ and actuate the hydraulic motor 119. The heat pump units which absorb heat from a heat rejecting medium (H.R. medium) which operates between $(T_R)_1$ and $(T_R)_2$ and release heat to a heat absorbing medium (H.A. medium) which operates between $(T_A)_1$ and $(T_A)_2$ and receive work through the hydraulic pump 123. The work performed by the hydraulic motor 119 is utilized in supplying the work needed in the hydraulic pump 123.

In selecting a working medium to be used in a new heat engine or heat pump, the factors to be considered are (1) the operating temperature range, (2) normal melting point of the medium, (3) $\Delta P/\Delta T$ of the melting curve, (4) latent heat of melting (5) $\Delta V$ associated with the phase change, and (6) cost and availability. The cost of a heat engine or a heat pump is related to the operating pressure which determines the wall thickness of the medium containing conduits. The operating pressure is related to the operating temperature range, the normal melting point of the medium and $\Delta P/\Delta T$ of the melting curve of the medium. The melting point of the medium under the highest operating pressure $T_H$ can be evaluated as $$T_H = T_M + \frac{1}{\frac{\Delta P}{\Delta T}} \times (\Delta P)_{max}.$$

where $T_M$ is normal melting point of the medium, $(\Delta P)_{max}$ is the maximum operating pressure minus the normal pressure, and $\Delta P/\Delta T$ is the slope of the melting point curve of the medium. The operating temperature range must be within the range $T_M$ to $T_H$. Table 1 is a list of $\Delta P/\Delta T$ values for various substances. For a heat engine or heat pump to be operated between 10° C to 100° C, one may use cyclohexane as its working medium, the maximum operating pressure is found to be $$P_H = 1 \text{ atm} + 19 \ \frac{\text{atm}}{°C} \times (100 - 6.55) \ °C$$

$$= 1776 \text{ atm}.$$

Since the wall thickness of a conduit required to sustain a given high pressure decreases as the conduit diameter decreases, and since the conduit surface area available for heat transfer increases as the conduit diameter decreases, it is advantageous to use a heat pump unit or a heat pump unit with a small conduit diameter. The economy improves greatly as the conduit diameter is decreased to say less than ¼ inch, or even less than ⅛ inch.

Finally, it is noted that a heat engine of this type can be utilized in recovering work from low grade heat sources, such as heat energy usually associated with thermal pollution, geothermal energy, and solar energy collected.

What we claim as our invention and desire to secure by Letters Patent is:

1. A system containing a working medium undergoing a cyclic process which comprises a first step of removing heat energy from a heat source at a first temperature and a second step of releasing heat energy to a heat sink at a second temperature and has work interaction with its surrounding, wherein the system comprises of a quantity of a working medium which may be melted under a first pressure as it removes heat at the said first temperature and be solidified under a second pressure as it releases heat at the said second temperature, and be denoted as the S/L medium, a pressure container of such strength to sustain both the said first pressure and the second pressure and having a first opening and a second opening, the S/L medium being contained in the pressure container, means for deriving a work output from the high pressure fluid and a liquid medium storage, a high pressure conduit and a low pressure conduit, the first opneing and the second opening of the pressure container being respectively connected to means for deriving a work output from the high pressure fluid and the liquid medium storage through the high pressure conduit and low pressure conduit, a first valve mean for controlling fluid flow in the high pressure conduit and a second valve mean for controlling fluid flow in the low pressure conduit.

2. A system of claim 1, wherein the first temperature is higher than the second temperature and the S/L medium belongs to the type that expands as it is melted and contracts as it is solidified, thereby the first pressure and the second pressure being a relatively high pressure and a relatively low pressure, and during the first step of removing heat energy at the first temperature, the medium melts and expands under the high pressure to cause a fluid flow under the high pressure through the first valve means and the high pressure conduit, with the second valve means being closed, to actuate means for deriving a work output from the high pressure fluid and perform work to the surrounding, and during the second step of releasing heat energy at the second temperature, the medium solidifies and contracts under the low pressure to cause a fluid flow from the liquid medium storage through the low pressure conduit and the second valve means into the pressure container, with the first valve means being closed.

3. A system of claim 1, wherein the first temperature is higher than the second temperature and the S/L medium belongs to the type that contracts as it is melted and expands as it is solidified, thereby the first pressure and the second pressure being a relatively low pressure and a relatively high pressure, and during the second step of releasing heat energy at the second temperature, the medium solidifies and, expands under the high pressure to cause a fluid flow under the high pressure through the first valve means and the high pressure conduit, with the second valve means being closed, to actuate means for deriving a work output from the high pressure fluid and perform work to the surrounding, and during the first step of removing heat energy at the first temperature, the medium melts and contracts under the low pressure to cause a fluid flow from the liquid medium storage through the low pressure conduit and the second valve means into the pressure container, with the first valve means being closed.

4. A system of claim 1, wherein the first temperature is lower than the second temperature and the S/L medium belongs to the type that expands as it is melted and contracts as it is solidified, thereby the first pressure and the second pressure being a relatively low pressure and a relatively high pressure; during the second step of releasing heat energy at the second temperature, with the first and second valve means being respectively open and close, the medium solidifies and contracts under the high pressure and a quantity of fluid is introduced to the pressure container through the high pressure conduit and the first valve means by supplying work means for deriving a work output from the high pressure fluid; and during the first step of removing heat energy at the first temperature, with the first and second valve means being respectively close and open, the medium melts and expands under the low pressure to cause a quantity of fluid to flow out of the pressure container through the second valve means and the low pressure conduit into the liquid medium storage.

5. A system of claim 1, wherein the first temperature is lower than the second temperature and the S/L medium belongs to the type that contracts as it is melted and expands as it is solidified, thereby the first pressure and the second pressure being a relatively high pressure and a relatively low pressure; during the first step of removing heat energy at the first temperature, with the first and second valve means being respectively open and close, the medium melts and contracts under the high pressure and a quantity of fluid is introduced to the pressure container through the high pressure conduit and the first valve means by supplying work to means for deriving a work output from the high pressure fluid; and during the second step of removing heat energy at the second temperature, with the first and second valve means being respectively close an open, the medium solidifies and expands under the low pressure to cause a quantity of fluid to flow out of the pressure container through the second valve means and the low pressure conduit into the liquid medium storage.

* * * * *